United States Patent
Erickson et al.

(10) Patent No.: US 10,400,146 B2
(45) Date of Patent: Sep. 3, 2019

(54) SINTERED ABRASIVE PARTICLES, METHOD OF MAKING THE SAME, AND ABRASIVE ARTICLES INCLUDING THE SAME

(71) Applicant: 3M INNOVATIVE PROPERTIES COMPANY, St. Paul, MN (US)

(72) Inventors: Dwight D. Erickson, Woodbury, MN (US); Anatoly Z. Rosenflanz, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 129 days.

(21) Appl. No.: 14/782,475

(22) PCT Filed: Mar. 27, 2014

(86) PCT No.: PCT/US2014/032043
§ 371 (c)(1),
(2) Date: Oct. 5, 2015

(87) PCT Pub. No.: WO2014/165390
PCT Pub. Date: Oct. 9, 2014

(65) Prior Publication Data
US 2016/0068729 A1    Mar. 10, 2016

Related U.S. Application Data

(60) Provisional application No. 61/808,955, filed on Apr. 5, 2013.

(51) Int. Cl.
*C09K 3/14* (2006.01)
*C04B 35/111* (2006.01)
(Continued)

(52) U.S. Cl.
CPC ............ *C09K 3/1409* (2013.01); *C01F 7/027* (2013.01); *C01F 7/38* (2013.01); *C04B 35/1115* (2013.01);
(Continued)

(58) Field of Classification Search
CPC ................ C09K 3/1409; C04B 35/626; C04B 35/62665
See application file for complete search history.

(56) References Cited

U.S. PATENT DOCUMENTS 1,161,620 A    11/1915    Coulter
1,192,709 A    7/1916     Tone
(Continued)

FOREIGN PATENT DOCUMENTS

CA    2407736 A1    10/2002
CN    1040814 A     3/1990
(Continued)

OTHER PUBLICATIONS

McArdle, "Transformation and Microstructure Control in Boehmite-Derived Alumina by Ferric Oxide Seeding," Advanced Ceramic Materials, 1988, vol. 3, No. 4, pp. 387-392.
(Continued)

*Primary Examiner* — Pegah Parvini
(74) *Attorney, Agent, or Firm* — Bradford B. Wright

(57) ABSTRACT

A method of making sintered abrasive particles includes passing alumina precursor particles through a flame under conditions such that they are converted to alpha alumina. The precursor particles comprise a precursor of alpha alumina and have an average particle size of less than or equal to 500 microns. Sintered abrasive particles have a cellular microstructure comprising alpha alumina crystal grains of alpha alumina having a maximum dimension of less than about 3 microns are also disclosed. The sintered abrasive
(Continued)

particles have an average particle size of less than or equal to 500 microns, and are essentially free of seed particles and alpha alumina grain size modifiers. Abrasive articles comprising a binder and a plurality of the sintered abrasive particles are also disclosed.

8 Claims, 7 Drawing Sheets

(51) Int. Cl.
    *C04B 35/626*     (2006.01)
    *C01F 7/02*     (2006.01)
    *C01F 7/38*     (2006.01)

(52) U.S. Cl.
    CPC .... *C04B 35/6268* (2013.01); *C04B 35/62665* (2013.01); *C01P 2004/03* (2013.01); *C01P 2004/45* (2013.01); *C01P 2004/61* (2013.01); *C01P 2004/62* (2013.01); *C04B 2235/3218* (2013.01)

(56) References Cited

U.S. PATENT DOCUMENTS

| | | | |
|---|---|---|---|
| 1,247,337 A | 11/1917 | Saunders | |
| 1,268,533 A | 6/1918 | Allen | |
| 2,127,504 A | 8/1938 | Derr | |
| 2,424,645 A | 7/1947 | Baumann | |
| 2,958,593 A | 11/1960 | Hoover | |
| 3,340,205 A | 9/1967 | Hayes | |
| 3,781,172 A | 12/1973 | Pett | |
| 3,859,407 A * | 1/1975 | Blanding | B01J 2/22 |
| | | | 241/3 |
| 3,891,408 A | 6/1975 | Rowse | |
| 3,893,826 A | 7/1975 | Quinan | |
| 3,957,598 A | 5/1976 | Merkl | |
| 4,126,429 A | 11/1978 | Watson | |
| 4,311,489 A | 1/1982 | Kressner | |
| 4,314,827 A | 2/1982 | Leitheiser | |
| 4,457,767 A | 7/1984 | Poon | |
| 4,518,397 A | 5/1985 | Leitheiser | |
| 4,543,107 A | 9/1985 | Rue | |
| 4,588,419 A | 5/1986 | Caul | |
| 4,623,364 A | 11/1986 | Cottringer | |
| 4,652,275 A | 3/1987 | Bloecher | |
| 4,734,104 A | 3/1988 | Broberg | |
| 4,737,163 A | 4/1988 | Larkey | |
| 4,741,743 A | 5/1988 | Narayanan | |
| 4,744,802 A | 5/1988 | Schwabel | |
| 4,751,138 A | 6/1988 | Tumey | |
| 4,770,671 A | 9/1988 | Monroe | |
| 4,799,939 A | 1/1989 | Bloecher | |
| 4,800,685 A | 1/1989 | Haynes, Jr. | |
| 4,881,951 A | 11/1989 | Wood | |
| 4,898,597 A | 2/1990 | Hay | |
| 4,952,389 A | 8/1990 | Szymanski | |
| 4,960,441 A | 10/1990 | Pellow | |
| 4,997,461 A | 3/1991 | Markhoff-Matheny | |
| 5,011,508 A | 4/1991 | Wald | |
| 5,023,212 A | 6/1991 | Dubots | |
| 5,037,453 A | 8/1991 | Narayanan | |
| 5,090,968 A | 2/1992 | Pellow | |
| 5,094,672 A | 3/1992 | Giles, Jr. | |
| 5,110,332 A | 5/1992 | Isaksson | |
| 5,118,326 A | 6/1992 | Lee | |
| 5,131,926 A | 7/1992 | Rostoker | |
| 5,139,978 A | 8/1992 | Wood | |
| 5,143,522 A | 9/1992 | Gibson | |
| 5,152,917 A | 10/1992 | Pieper | |
| 5,201,916 A | 4/1993 | Berg | |
| 5,203,884 A | 4/1993 | Buchanan | |
| 5,203,886 A | 4/1993 | Sheldon | |
| 5,227,104 A | 7/1993 | Buaer | |
| 5,259,147 A | 11/1993 | Falz | |
| 5,282,875 A | 2/1994 | Wood | |
| 5,336,280 A | 8/1994 | Dubots | |
| 5,366,523 A | 11/1994 | Rowenhorst | |
| 5,368,825 A | 11/1994 | Calcote | |
| 5,378,251 A | 1/1995 | Culler | |
| 5,417,726 A | 5/1995 | Stout | |
| 5,427,595 A | 6/1995 | Phil | |
| 5,429,647 A | 7/1995 | Larmie | |
| 5,435,816 A | 7/1995 | Spurgeon | |
| 5,436,063 A | 7/1995 | Follett | |
| 5,443,906 A | 8/1995 | Phil | |
| 5,496,386 A | 3/1996 | Broberg | |
| 5,498,269 A | 3/1996 | Larmie | |
| 5,516,348 A * | 5/1996 | Conwell | C09K 3/1436 |
| | | | 501/153 |
| 5,520,711 A | 5/1996 | Helmin | |
| 5,547,479 A * | 8/1996 | Conwell | C04B 35/1115 |
| | | | 501/153 |
| 5,549,961 A * | 8/1996 | Haas | B24D 3/28 |
| | | | 428/143 |
| 5,549,962 A | 8/1996 | Holmes | |
| 5,551,963 A | 9/1996 | Larmie | |
| 5,567,150 A | 10/1996 | Conwell | |
| 5,593,467 A | 1/1997 | Monroe | |
| 5,609,706 A | 3/1997 | Benedict | |
| 5,651,801 A | 7/1997 | Monroe | |
| 5,665,127 A | 9/1997 | Moltgen | |
| 5,672,097 A | 9/1997 | Hoopman | |
| 5,679,067 A | 10/1997 | Johnson | |
| 5,690,707 A * | 11/1997 | Wood | C04B 35/01 |
| | | | 51/293 |
| 5,725,162 A | 3/1998 | Garg | |
| 5,738,696 A | 4/1998 | Wu | |
| 5,776,214 A | 7/1998 | Wood | |
| 5,782,940 A * | 7/1998 | Jayan | C04B 35/1115 |
| | | | 501/153 |
| 5,863,308 A | 1/1999 | Qi | |
| 5,903,951 A | 5/1999 | Ionta | |
| 5,946,991 A | 9/1999 | Hoopman | |
| 5,954,844 A | 9/1999 | Law | |
| 5,961,674 A | 10/1999 | Galiardi | |
| 5,975,987 A | 11/1999 | Hoopman | |
| 5,975,988 A | 11/1999 | Christianson | |
| 6,048,577 A | 4/2000 | Garg | |
| 6,083,622 A | 7/2000 | Garg | |
| 6,129,540 A | 10/2000 | Hoopman | |
| 6,254,981 B1 | 7/2001 | Castle | |
| 6,802,878 B1 | 10/2004 | Monroe | |
| 7,141,522 B2 | 11/2006 | Rosenflanz | |
| 7,141,523 B2 | 11/2006 | Rosenflanz | |
| 7,232,543 B2 | 6/2007 | Celikkaya | |
| 7,332,453 B2 | 2/2008 | Rosenflanz | |
| 8,142,531 B2 | 3/2012 | Adefris | |
| 8,142,891 B2 | 3/2012 | Culler | |
| 2003/0110706 A1 | 6/2003 | Rosenflanz | |
| 2005/0132655 A1 | 6/2005 | Anderson | |
| 2008/0190034 A1* | 8/2008 | Rosenflanz | C03C 3/125 |
| | | | 51/307 |
| 2012/0157358 A1* | 6/2012 | Fang | E21B 43/267 |
| | | | 507/269 |
| 2013/0212952 A1* | 8/2013 | Welygan | C09K 3/1409 |
| | | | 51/309 |

FOREIGN PATENT DOCUMENTS

| | | |
|---|---|---|
| CN | 1046926 A | 11/1990 |
| EP | 0304616 A1 | 7/1988 |
| EP | 2 857 476 A1 | 4/2015 |
| GB | 1193258 | 5/1970 |
| JP | S7-207672 | 12/1982 |
| JP | H02-293371 A | 12/1990 |
| JP | H03-28120 A | 2/1991 |
| JP | H06-321534 A | 11/1994 |
| JP | 07-309668 | 11/1995 |
| JP | H08-2913 A | 1/1996 |
| JP | 2003-509579 T | 3/2003 |
| JP | 2013-544736 T | 2/2014 |

(56) References Cited

FOREIGN PATENT DOCUMENTS

OTHER PUBLICATIONS

International Search Report for PCT International Application No. PCT/US2014/032043, dated Aug. 27, 2014, 6pgs.
Extended European Search Report, EP147803103.0, dated Oct. 18, 2016, 3 pages.

* cited by examiner

1μm

1μm

1μm

1μm

SINTERED ABRASIVE PARTICLES, METHOD OF MAKING THE SAME, AND ABRASIVE ARTICLES INCLUDING THE SAME

TECHNICAL FIELD

The present disclosure broadly relates to abrasive particles and methods of making and using them.

BACKGROUND

Sintered abrasive particles and abrasive articles including them are useful for abrading, finishing, or grinding a wide variety of materials and surfaces in the manufacturing of goods. Of the wide variety of known abrasive particles, fused abrasive particles (e.g., including fused alumina, heat treated fused alumina, and fused alumina zirconia) and sintered ceramic abrasive particles (including sol-gel-derived sintered ceramic abrasive particles) are widely used in the abrasives art.

Alpha alumina abrasive particles are a major class of abrasive particles used in the abrasives industry. Fused alpha alumina abrasive particles are typically made by charging a furnace with an alumina source (such as aluminum ore or bauxite), as well as other desired additives, heating the material above its melting point, cooling the melt to provide a solidified mass, crushing the solidified mass into particles, and then screening and grading the particles to provide the desired abrasive particle size distribution. Although fused alpha alumina abrasive particles and fused alumina-zirconia abrasive particles are still widely used in abrading applications (including those utilizing coated and bonded abrasive products), the premier abrasive particles for many abrading applications since about the mid-1980s are sol-gel-derived alpha alumina particles (also referred to as sintered ceramic alpha alumina particles).

Sol-gel-derived alpha alumina abrasive particles may have a microstructure made up of very fine alpha alumina crystallites (also known as "alpha alumina crystal grains"), with or without the presence of secondary phases added. Sol-gel-derived alumina abrasives are conventionally produced by drying an aqueous sol or gel of an alpha alumina precursor (typically, but not necessarily, boehmite) to remove the water component of the gel, breaking up the dried gel into particles of the desired size for abrasive grits; optionally calcining the particles (typically at a temperature of from about 400-800° C.) to form a transitional alumina (e.g., gamma alumina), and then sintering the dried and optionally calcined particles at a temperature sufficiently high to convert them to the alpha alumina form.

In one embodiment of a sol-gel process, the alpha alumina precursor is "seeded" with a material having the same crystal structure as, and lattice parameters as close as possible to, those of alpha alumina itself. The "seed" (a nucleating agent) is added in as finely divided form as possible and is dispersed uniformly throughout the sol or gel. It can be added for the beginning or formed in situ. The function of the seed is to cause the transformation to the alpha form to occur uniformly throughout the precursor at a lower temperature than is needed in the absence of the seed. This seeded process produces a crystalline structure in which individual alpha alumina crystal grains (that is, those areas of substantially the same crystallographic orientation separated from adjacent crystals by high angle grain boundaries), are very uniform in size and are essentially all sub-micron in diameter. Suitable seeds include alpha alumina itself and other compounds such as alpha ferric oxide, chromium suboxide, nickel titanate, and other compounds that have lattice parameters sufficiently similar to those of alpha alumina to be effective to cause the generation of alpha alumina from a precursor at a temperature below that at which the conversion normally occurs in the absence of such seed.

Similarly, one or more alpha alumina crystal grain size modifiers (e.g., a spinel forming metal oxide) may also be added to the sol-gel, or impregnated into the dried sol-gel particles or calcined particles to control the size of alumina crystal grains in the resultant alpha alumina abrasive particle.

However, the use of seeds and/or alpha alumina crystal grain size modifiers adds complexity and cost to the sol-gel process.

SUMMARY

In one aspect, the present disclosure provides a method of making sintered abrasive particles, the method comprising:

passing precursor particles through a flame under conditions such that they are converted to the sintered abrasive particles, wherein the precursor particles comprise a calcined precursor of alpha alumina, and wherein the precursor particles have an average particle size of less than or equal to 500 microns.

In another aspect, the present disclosure provides abrasive particles having a cellular microstructure comprising alpha alumina crystal grains of alpha alumina having a maximum dimension of less than about 3 microns, wherein the sintered abrasive particles have an average particle size of less than or equal to 500 microns, and wherein the sintered abrasive particles are essentially free of seed particles and alpha alumina grain size modifiers.

Alpha alumina abrasive particles made according to the present disclosure are useful in abrasive articles. Accordingly, in another aspect, the present disclosure provides an abrasive article comprising a binder and a plurality of abrasive particles, wherein at least a portion of the sintered abrasive particles are alpha alumina abrasive particles according to the present disclosure.

Advantageously, methods according to the present disclosure provides a route to forming alpha alumina abrasive particles via the sol-gel process without relying on seed particles or alpha alumina crystal grain size modifiers to provide high density alpha alumina particles with small alpha alumina crystal grains. Moreover, the method is typically rapid.

As used herein, the term "calcined" means heated to high temperature (e.g., 650° C.) below the melting point, for sufficient time to remove adsorbed and chemically bound (as hydrate) water and other volatile compounds.

As used herein, the term "essentially free of" means, on a weight basis, containing at most a trivial amount (e.g., less than 0.1 percent, less than 0.01 percent, less than 0.001 percent, or even less than 0.0001 percent) or completely free of.

As used herein, the term "shaped" as applied to a particle means that the particle has a non-random shape imparted by the method used to make it, and expressly excludes mechanically crushed and/or milled particles.

Features and advantages of the present disclosure will be further understood upon consideration of the detailed description as well as the appended claims.

Figure 1:
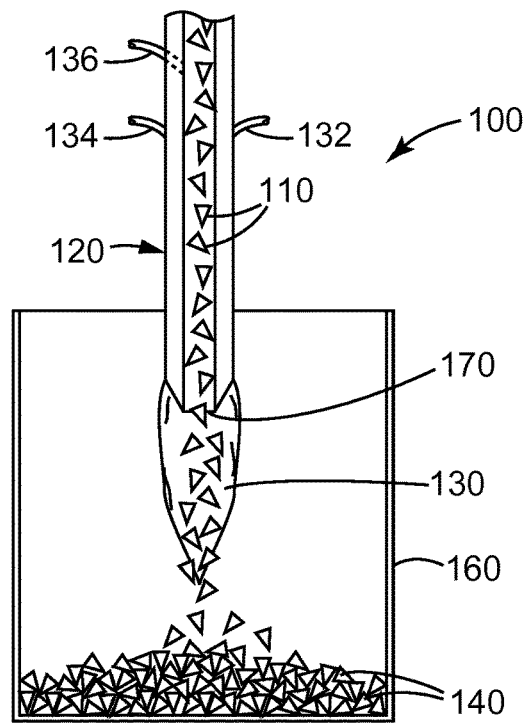
FIG. 1 is a process flow diagram showing an exemplary method of making abrasive particles according to the present disclosure.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The figures may not be drawn to scale.

DETAILED DESCRIPTION

In one embodiment of the present disclosure, precursor particles comprising a calcined precursor of alpha alumina are passed through a flame under conditions such that they are converted to the sintered abrasive particles. Referring now to the exemplary process 100 shown in FIG. 1, calcined precursor particles 110 are dropped through nozzle 120, exiting at opening 170 into flame 130 where conversion of the calcined precursor particles 110 into abrasive particles 140 occurs. Sintered abrasive particles 140 are collected at the bottom of containment vessel 160. Flame 130 is fed by fuel inlet 132 and oxygen inlet 134. Argon is introduced through argon inlet 136 and used to accelerate the velocity of the calcined precursor particles 110 through nozzle 120.

The resultant abrasive particles have a cellular microstructure formed of sintered alpha alumina crystal grains. Typically, the alpha alumina crystal grains have a small size, although this is not a requirement. In some embodiments, the cellular microstructure comprises alpha alumina crystal grains having a maximum dimension of less than about 3 microns, less than about 2.5 microns, even less than about 2 microns.

Even though the method of the present disclosure typically involves flame contact times on the order of a second or less, which is not a requirement, the resultant sintered abrasive particles may have low porosity. For example, the sintered abrasive particles may have a cellular microstructure comprising alpha alumina, wherein the alpha alumina has an areal porosity of less than or equal to 5 percent, as measured using image analysis by cross-section of the sintered abrasive particle at high magnification (e.g., 10,000 times magnification).

For example, the sintered abrasive particles may have an areal porosity of less than or equal to 4.5 percent, less than or equal to 4 percent, less than or equal to 3.5 percent, less than or equal to 3 percent, less than or equal to 2.5 percent, less than or equal to one percent, less than or equal to 0.5 percent, or even less than or equal to 0.1 percent. This is unexpected, since conventional processes of forming alpha alumina based particles from alpha alumina precursor particles with comparable porosities typically involve heating times ranging from tens of minutes to hours.

Areal porosity can be determined using conventional techniques such as, for example, using ImageJ software available from the U.S. National Institute of Health, Bethesda, Md. Random cross-sections of sintered abrasive particles are independently imaged using a field emission scanning electron microscope at high magnification (e.g., a magnification of from 2,000× to 10,000×) using backscattered electrons. Because of the relatively high magnification, a random area was selected on each of the cross-sectioned surface of the abrasive particles. The images were subsequently analyzed using the ImageJ image analysis software. Data was obtained by manually measuring the area of individual exposed voids and combining these individual pore area measurements to obtain the total area of voids per image, and then dividing this value by the area of the total field of view area to obtain the area porosity (i.e., porosity determined on an area basis). Conventional statistical methods (e.g., regarding the number of measurements and samples) can be applied to ascertain porosity.

The precursor particles comprise a calcined precursor of alpha alumina. Examples of alpha alumina precursors that can be calcined include: transitional aluminas (e.g., boehmite, diaspore, gibbsite, bayerite, nordstrandite); aluminum salts and complexes such as, for example, basic aluminum carboxylates (e.g., basic aluminum carboxylates of the general formula $Al(OH)_y(carboxylate)_{3-y}$, where y is between 1 and 2, preferably between 1 and 1.5, and the carboxylate counterion is selected from the group consisting of formate, acetate, propionate, and oxalate, or combinations of these carboxylates, aluminum formoacetate, and aluminum nitroformoacetate); basic aluminum nitrates; partially hydrolyzed aluminum alkoxides; and combinations thereof. Basic aluminum carboxylates can be prepared by digesting aluminum metal in a solution of the carboxylic acid as described in U.S. Pat. No. 3,957,598 (Merkl). Basic aluminum nitrates can also be prepared by digesting aluminum metal in a nitric acid solution as described in U.S. Pat. No. 3,340,205 (Hayes et al.) or British Pat. No. 1,193,258 (Fletcher et al.), or by the thermal decomposition of aluminum nitrate as described in U.S. Pat. No. 2,127,504 (Derr et al.). These materials can also be prepared by partially neutralizing an aluminum salt with a base. The basic aluminum nitrates have the general formula $Al(OH)_z(NO_3)_{3-z}$, where z is from about 0.5 to 2.5.

Suitable boehmites include, for example, those commercially available under the trade designation "HIQ" (e.g., "HIQ-9015") from BASF Corp., Florham Park, N.J., and those commercially available under the trade designations "DISPERAL", "DISPAL", and "CATAPAL D" from Sasol North America, Houston, Tex. These boehmites or alumina monohydrates are in the alpha form, and include relatively little, if any, hydrated phases other than monohydrates (although very small amounts of trihydrate impurities can be present in some commercial grade boehmite, which can be tolerated). They have a low solubility in water and have a high surface area (typically at least about 180 square meters/gram). Preferred boehmites have an average crystallite size of less than about 20 nanometers (more preferably, less than 12 nanometers). In this context, "crystallite size" is determined by the 120 and 031 x-ray reflections.

The precursor particles may contain water and/or organic solvents, especially if they are formed from a sol or gel, or contained within a slurry. Desirably, the content of volatile components (e.g., water and/or organic solvents) is minimized so as to avoid explosive volatilization of the volatile components resulting in damage to or destruction of the precursor particles upon contact with the flame. Preferably, the content of such volatile components in the precursor particles is less than about 10 weight percent, less than about 5 weight percent, or even less than about 1 weight percent of the precursor particles, although this is not a requirement.

In some embodiments, the precursor particles comprise crushed transitional alumina particles. In some embodiments, the precursor particles are formed from a sol-gel composition comprising an alpha alumina precursor, for example, as described above. The sol-gel composition may be formed into particles, for example, by processes such as extrusion (cut to length), screen printing onto a releasable liner, or filling cavities of a mold. Of these, the latter is typically preferred. As used herein, the term "sol-gel composition" refers to a colloidal dispersion of solid particles in a liquid that forms a three-dimensional network of the solid particles on heating over a period of time, or removal of some of the liquid. In some cases, gel formation may be induced by addition of polyvalent metal ions.

In a typical process sequence involving a sol-gel composition, a sol-gel composition comprising an alpha alumina precursor is provided.

The sol-gel composition should comprise a sufficient amount of liquid for the viscosity of the sol-gel composition to be sufficiently low to enable filling the mold cavities and replicating the mold surfaces, but not so much liquid as to cause subsequent removal of the liquid from the mold cavity to be prohibitively expensive. In one embodiment, a sol-gel composition comprises from 2 to 90 weight percent of an alpha alumina precursor material (e.g., aluminum oxide monohydrate (boehmite)), and at least 10 weight percent, from 50 to 70 weight percent, or 50 to 60 weight percent, of volatile components such as water. In some embodiments, the sol-gel composition contains from 30 to 50 weight percent, or 40 to 50 weight percent of the alpha alumina precursor material.

A peptizing agent can be added to the sol-gel composition to produce a more stable hydrosol or colloidal sol-gel composition. Suitable peptizing agents are monoprotic acids or acid compounds such as acetic acid, hydrochloric acid, formic acid, and nitric acid. Multiprotic acids can also be used but they can rapidly gel the sol-gel composition, making it difficult to handle or to introduce additional components thereto. Some commercial sources of boehmite contain an acid titer (such as absorbed formic or nitric acid) that will assist in forming a stable sol-gel composition.

Seed particles and/or crystal grain size modifiers may optionally be added to the sol-gel composition, but advantageously they are typically not needed in order to achieve small alpha alumina crystal grain sizes.

Examples of optional alumina grain size modifiers include $Li_2O$, $Na_2O$, $MgO$, $SiO_2$, $CaO$, $SrO$, $TiO_2$, $MnO$, $Cr_2O_3$, $Fe_2O_3$, $CoO$, $NiO$, $ZnO$, $ZrO_2$, $SnO_2$, $HfO_2$, rare earth oxides (e.g., $La_2O_3$, $CeO_2$, $Pr_2O_3$, $Nd_2O_3$, $Sm_2O_3$, $Eu_2O_3$, $Gd_2O_3$, $Dy_2O_3$, $Er_2O_3$, $Yb_2O_3$, $TbO_2$, $Y_2O_3$), combinations thereof, and precursors thereof. In some embodiments, the precursor particles, and likewise the derived abrasive particles, are essentially free of any or all of the alumina grain size modifiers: $Li_2O$, $Na_2O$, $MgO$, $SiO_2$, $CaO$, $SrO$, $TiO_2$, $MnO$, $Cr_2O_3$, $Fe_2O_3$, $CoO$, $NiO$, $ZnO$, $ZrO_2$, $SnO_2$, $HfO_2$, rare earth oxides (e.g., $La_2O_3$, $CeO_2$, $Pr_2O_3$, $Nd_2O_3$, $Sm_2O_3$, $Eu_2O_3$, $Gd_2O_3$, $Dy_2O_3$, $Er_2O_3$, $Yb_2O_3$, $TbO_2$, $Y_2O_3$), combinations thereof, and precursors thereof.

The alpha alumina precursor may be "seeded" with a material having the same crystal structure as, and lattice parameters as close as possible to, those of alpha alumina. The "seed" particles are added in as finely divided form as possible, and are dispersed uniformly throughout the sol or gel. Seed particles can be added ab initio or it can be formed in situ. The function of seed particles is to cause the transformation to the alpha form to occur uniformly throughout the alpha alumina precursor at a much lower temperature than is needed in the absence of the seed. Suitable seeds include alpha alumina itself and also other compounds such as alpha ferric oxide, chromium suboxide, nickel titanate and a plurality of other compounds that have lattice parameters sufficiently similar to those of alpha alumina to be effective to cause the generation of alpha alumina from a precursor at a temperature below that at which the conversion normally occurs in the absence of such seed. Examples of suitable seed particles include particles of $Ti_2O_3$, $MgO.TiO_2$, $FeO.TiO_2$, $NiO.TiO_2$, $CoO.TiO_2$, $MnO.TiO_2$, $ZnO.TiO_2$, $V_2O_3$, $Ga_2O_3$, $Rh_2O_3$, alpha-$Al_2O_3$, alpha-$Cr_2O_3$, and alpha-$Fe_2O_3$ particles, preferably having an average particle size of from about 10 nm to about 120 nanometers, although other sizes may be used. In some embodiments, the precursor particles, and likewise the derived abrasive particles, are essentially free of seed particles such as, for example, alpha-$Al_2O_3$ seed particles, alpha-$Cr_2O_3$ seed particles, or alpha-$Fe_2O_3$ seed particles.

The sol-gel composition can be formed by any suitable means, such as, for example, simply by mixing aluminum oxide monohydrate with water containing a peptizing agent or by forming an aluminum oxide monohydrate slurry to which the peptizing agent is added. Defoamers and/or other suitable chemicals can be added to reduce the tendency to form bubbles or entrain air while mixing. Additional chemicals such as wetting agents, alcohols, and/or coupling agents can be added if desired.

Next, the sol-gel composition may be dried and crushed, or if shaped precursor particles are desired the sol-gel composition may be used to fill one or more cavities of a mold. The mold can have a generally planar bottom surface and a plurality of mold cavities, which may be in a production tool. The production tool can be a belt, a sheet, a continuous web, a coating roll such as a rotogravure roll, a sleeve mounted on a coating roll, or die. The production tool comprises polymeric material. Examples of suitable polymeric materials include thermoplastics such as polyesters, polycarbonates, poly(ether sulfone), poly(methyl methacrylate), polyurethanes, poly(vinyl chloride), polyolefins, polystyrene, polypropylene, polyethylene, combinations of the foregoing, and thermosetting materials. In one embodiment, the tooling is made from a polymeric or thermoplastic material. In another embodiment, the surfaces of the tooling in contact with the sol-gel while drying, such as the surfaces of the plurality of cavities, comprise a polymeric material while other portions of the tooling can be made from other materials. A suitable coating may be applied to a metal tooling to change its surface tension properties by way of example.

A polymeric or thermoplastic tool can be replicated off a metal master tool. The master tool will have the inverse pattern desired for the production tool. The master tool can be made in the same manner as the production tool. In one embodiment, the master tool is made out of metal, e.g., nickel and is diamond turned. The polymeric sheet material can be heated along with the master tool such that the polymeric material is embossed with the master tool pattern by pressing the two together. A polymeric or thermoplastic material can also be extruded or cast onto the master tool and then pressed. The thermoplastic material is cooled to solidify and produce the production tool. If a thermoplastic production tool is utilized, then care should be taken not to generate excessive heat that may distort the thermoplastic production tool limiting its life. Desirably, cavities in the production tooling have a draft angle of from 5 to 15 degrees to facilitate removal of the shaped precursor particles from the production tool, for example, as described in U.S. Pat. No. 8,142,531 (Adefris et al.). More information concerning the design and fabrication of production tooling or master tools can be found in U.S. Pat. No. 5,152,917 (Pieper et al.); U.S. Pat. No. 5,435,816 (Spurgeon et al.); U.S. Pat. No. 5,672,097 (Hoopman et al.); U.S. Pat. No. 5,946,991 (Hoopman et al.); U.S. Pat. No. 5,975,987 (Hoopman et al.); and U.S. Pat. No. 6,129,540 (Hoopman et al.).

Exemplary suitable cavity shapes include triangles, circles, rectangles, squares, hexagons, stars, or combinations thereof, all having a substantially uniform depth dimension. The depth dimension is equal to the perpendicular distance from the top surface to the lowermost point on the bottom surface. Exemplary suitable cavity shapes include truncated cones and pyramids (e.g., three-sided, four-sided, five-sided, or six-sided truncated pyramids).The depth of a given cavity can be uniform or can vary along its length and/or width. The cavities of a given mold (e.g., master tool or production tool) can be of the same shape or of different shapes.

Cavities in the mold may be at least partially (preferably completely) filled with the sol-gel composition by any suitable technique. In some embodiments, a knife roll coater or vacuum slot die coater can be used. A mold release compound can be used to aid in removing the particles from the mold if desired. Typical mold release agents include, for example, oils such as peanut oil or mineral oil, fish oil, silicones, polytetrafluoroethylene, zinc stearate, and graphite.

In one embodiment, the top surface of the mold is coated with the sol-gel composition. The sol-gel composition can be pumped onto top surface. Next, a scraper or leveler bar is used to force the sol-gel composition fully into cavities of the mold. The remaining portion of the sol-gel composition that does not enter cavity can be removed from top surface of the mold and recycled.

Next, volatile components of the sol-gel composition are at least partially removed to dry the sol-gel composition and form dried shaped precursor particles. Desirably, the volatile components are removed at a fast evaporation rates. In some embodiments, removal of the volatile component by evaporation occurs at temperatures above the boiling point of the volatile component. The upper limit to the drying temperature often depends on the material the mold is made from.

Dried shaped precursor particles can be removed from the cavities by using the following processes alone or in combination on the mold: gravity, vibration, ultrasonic vibration, vacuum, or pressurized air to remove the particles from the mold. If desired, the dried shaped precursor particles can be further dried outside of the mold. Typically, the precursor shaped abrasive particles will be dried for 10 to 480 minutes at a temperature from 50 to 160° C.

Optionally, but preferably, the dried shaped precursor particles are calcined at a temperature of from 500 to 800° C. for sufficient time (e.g., several hours) to remove bound water and increase durability in handling. This results in calcined shaped precursor particles.

Further details regarding sol-gel compositions comprising alpha alumina precursor material, including methods for making them and converting them into suitable precursor particles (e.g., shaped or crushed), can be found, for example, in U.S. Pat. No. 4,314,827 (Leitheiser et al.); U.S. Pat. No. 4,623,364 (Cottringer et al.); U.S. Pat. No. 4,744,802 (Schwabel); U.S. Pat. No. 4,770,671 (Monroe et al.); U.S. Pat. No. 4,881,951 (Wood et al.); U.S. Pat. No. 5,011,508 (Wald et al.); U.S. Pat. No. 5,090,968 (Pellow); U.S. Pat. No. 5,201,916 (Berg et al.); U.S. Pat. No. 5,227,104 (Bauer); U.S. Pat. No. 5,366,523 (Rowenhorst et al.); U.S. Pat. No. 5,547,479 (Conwell et al.); U.S. Pat. No. 5,498,269 (Larmie); U.S. Pat. No. 5,551,963 (Larmie); U.S. Pat. No. 5,725,162 (Garg et al.); U.S. Pat. No. 5,776,214 (Wood); U.S. Pat. No. 8,142,531 (Adefris et al.); and U.S. Pat. No. 8,142,891 (Culler et al.).

In some embodiments, the sol-gel composition may be dried and crushed to form the precursor particles, while in other embodiments the precursor particles are shaped precursor particles formed according to one of the methods discussed herein above.

The precursor particles should generally be sufficiently small that rapid heating occurs throughout the bodies of the particles, and also so that any moisture within the interior of the precursor particles can be rapidly removed without damage to the resultant abrasive particle. Accordingly, the precursor particles and/or the resultant abrasive particles should generally be sufficiently small to pass through a test sieve having 220-micron nominal sieve openings. Of course, finer particles may also be used; for example, the precursor particles may be sufficiently small to pass through a test sieve having a U.S. mesh size of 70 (212-micron nominal sieve openings), 80 (180-micron nominal sieve openings), 100 (150-micron nominal sieve openings), 120 (125-micron nominal sieve openings), 140 (106-micron nominal sieve openings), 170 (90-micron nominal sieve openings), 200 (75-micron nominal sieve openings), 230 (63-micron nominal sieve openings), 270 (53-micron nominal sieve openings), 325 (45-micron nominal sieve openings), 400 (38-micron nominal sieve openings), or even 500 (25-micron nominal sieve openings). As used herein, the term "test sieve" refers to a wire mesh test sieve in compliance with ASTM Test Method E11-09$^{\varepsilon1}$ entitled "Standard Specification for Woven Wire Test Sieve Cloth and Test Sieves" (November 2010).

The precursor particles are next passed through a flame that serves to convert at least a portion of the alpha alumina precursor into alpha alumina. In some embodiments, at least 70 weight percent, at least 80 weight percent, at least 90 weight percent, at least 95 weight percent, at least 99 weight percent, at least 99.5 weight percent, or even 100 weight percent of the alpha alumina precursor is converted to alpha alumina by passing it through the flame. If desired, the precursor particles may be passed through the flame multiple times to further increase the fraction converted to alpha alumina.

Various apparatuses have been devised that are suitable for practicing the present disclosure. In some embodiments, the precursor particles are dropped (i.e., they are gravity fed) through a tube into a flame along its longitudinal axis. As the precursor particles fall through the flame they are heated and alpha alumina precursor material is converted to alpha alumina. An apparatus suitable for practicing this method includes a powder feeder having a canister (8 cm diameter) at the bottom of which is a 70 U.S. mesh screen (212-micron opening size) as illustrated in FIGS. 1-6 and in the specification of U.S. Pat. Appln. Publ. 2005/0132655 A1 (Anderson et al.), wherein the screens are made from stainless steel (available from W.S. Tyler Inc., Mentor, Ohio). In use, precursor particles are filled into the canister and forced through the openings of the screen using a rotating brush. The flame is provided by a Bethlehem bench burner PM2D Model B obtained from Bethlehem Apparatus Co., Hellertown, Pa. The burner has a central feed port (0.475 cm (3/16 inch) inner diameter) through which precursor particles are introduced into the flame. Hydrogen and oxygen flow rates for the burner can be adjusted for optimum temperature, which typically may vary with the specific precursor particles used. The angle at which the flame hit the water is approximately 90°, and the flame length, burner to water surface, is approximately 38 centimeters (cm). An inert gas may be mixed with the precursor particles to propel them through the flame.

The flame temperature is preferably selected to maximize (although this is not a requirement) conversion of the precursor particles and densification of the resultant abrasive particles while minimizing melting of the alpha alumina. This necessarily will depend on various parameters such as, for example, particle size and transit time through the flame. Representative flame temperatures are in the range of from 1400 to 2700° C., preferably from 1600 to 2200° C., although other temperatures can also be used.

Although the precursor particles are preferably passed through the flame substantially along a longitudinal axis of the flame, other configurations are also possible. For example, the precursor particles may travel through the flame at an orthogonal orientation (i.e., traversing the width of the flame).

Once passed through the flame, the precursor particles are converted to sintered abrasive particles and collected at the bottom of the containment vessel.

If desired, the sintered abrasive particles may be further sintered by subsequent heating in an oven, for example.

Alternatively, as the precursor particles become smaller, they may have a tendency to melt and form spheroidal particles that are undesirable for abrading applications. In such cases, the size and temperature of the flame and the contact time of the precursor particles with the flame should be reduced until useful sintering conditions are established. The exact conditions will necessarily vary depending on size, shape, and composition of the precursor particles and apparatus design, but are within the capability one having ordinary skill in the art.

While the precursor particles may be accelerated through the flame by gravity, it is also possible for them to be propelled, for example, by a compressed gas as in the general manner of a flame sprayer apparatus, although care should be taken to use a heating temperature and residence time such that the precursor particles do not become molten and/or fuse together in a mass.

The thus formed abrasive particles comprise alpha alumina having a cellular microstructure comprising sintered alpha alumina crystal grains. The alpha alumina crystal grains have a maximum dimension of less than about 3 microns. In some embodiments, the alpha alumina crystal grains have a maximum dimension of less than about 2.5 microns, or even less than about 2 microns.

In some embodiments, the sintered abrasive particles comprise at least 50 weight percent, at least 55 weight percent, at least 60 weight percent, at least 65 weight percent, at least 70 weight percent, at least 75 weight percent, at least 80 weight percent, at least 85 weight percent, at least 90 weight percent, at least 95 weight percent, at least 99 weight percent, at least 99.5 weight percent or even at least 99.9 weight percent weight percent of alpha alumina Preferably, the sintered abrasive particles consist essentially of alpha alumina, that is, they are free of chemical impurities in quantities sufficient to degrade the hardness of the sintered abrasive particles more than 5 percent, 4 percent, 3 percent, 2 percent, or even more than 1 percent relative to alpha alumina particles of the same dimensions.

In some embodiments, the sintered abrasive particles have an apparent density that is at least 95 (at least 96, at least 97, at least 97.5, at least 98, 98.5, at least 99, or even at least 99.5) percent of the theoretical density of alpha alumina.

Advantageously, at appropriate temperatures methods according to the present disclosure minimizes the amount of melting that occurs in the sintered abrasive particles. This means that shapes of the precursor particles may be at least substantially retained in the resultant abrasive particles. Thus sharp edges and/or points in the precursor particles may result in corresponding sharp edges and/or points. As used herein, the term "sharp" means having a well-defined form, in contrast to nebulous melted globular features. Exemplary abrasive particle shapes include triangular prisms, cylinders, rectangular prisms, square prisms, hexagonal prisms, star-shaped prisms, truncated cones and pyramids (e.g., three-sided, four-sided, five-sided, or six-sided truncated pyramids).

Abrasive particles made according to the present disclosure can be incorporated into an abrasive article, or used in loose form. Abrasive particles are generally graded to a given particle size distribution before use. Such distributions typically have a range of particle sizes, from coarse particles to fine particles. In the abrasive art this range is sometimes referred to as a "coarse", "control", and "fine" fractions. Abrasive particles graded according to abrasive industry accepted grading standards specify the particle size distribution for each nominal grade within numerical limits. Such industry accepted grading standards (i.e., abrasive industry specified nominal grade) include those known as the American National Standards Institute, Inc. (ANSI) standards, Federation of European Producers of Abrasive Products (FEPA) standards, and Japanese Industrial Standard (JIS) standards.

Exemplary ANSI grade designations (i.e., specified nominal grades) include: ANSI 80, ANSI 90, ANSI 100, ANSI 120, ANSI 150, ANSI 180, ANSI 220, ANSI 240, ANSI 280, ANSI 320, ANSI 360, ANSI 400, and ANSI 600. Exemplary FEPA grade designations include P80, P100, P120, P150, P180, P220, P320, P400, P500, P600, P800, P1000, and P1200. Exemplary JIS grade designations include JIS80, JIS100, JIS150, JIS180, JIS220, JIS240, JIS280, JIS320, JIS360, JIS400, JIS600, JIS800, JIS1000, J151500, J152500, J154000, J156000, J158000, and JIS10,000.

Alternatively, the sintered abrasive particles can be graded to a nominal screened grade using U.S.A. Standard Test Sieves conforming to ASTM E-11 "Standard Specification for Wire Cloth and Sieves for Testing Purposes." ASTM E-11 proscribes the requirements for the design and construction of test sieves using a medium of woven wire cloth mounted in a frame for the classification of materials according to a designated particle size. A typical designation may be represented as −80+100 meaning that the sintered abrasive particles pass through a number 80 test sieve and are retained on a 100 test sieve. In various embodiments of the present disclosure, the sintered abrasive particles can have a nominal screened grade comprising: −70+80, −80+

100, −100+120, −120+140, −140+170, −170+200, −200+230, −230+270, −270+325, −325+400, −400+450, −450+500, or −500+635.

Abrasive particles according to the present disclosure can be used in combination with other abrasive particles if desired.

Abrasive particles according to the present disclosure may be used in a loose form or slurry, and/or incorporated into abrasive products (e.g., bonded abrasives, coated abrasives, and nonwoven abrasives). Criteria used in selecting abrasive particles used for a particular abrading application typically include: abrading life, rate of cut, substrate surface finish, grinding efficiency, and product cost.

Coated abrasive articles generally include a backing, abrasive particles, and at least one binder to hold the sintered abrasive particles onto the backing. The backing can be any suitable material, including, for example, cloth, polymeric film, fiber, nonwoven webs, paper, combinations thereof, and treated versions thereof. Suitable binders include, for example, inorganic or organic binders (including thermally curable resins and radiation curable resins). The sintered abrasive particles can be present in one layer or in two layers of the coated abrasive article.

Figure 2:
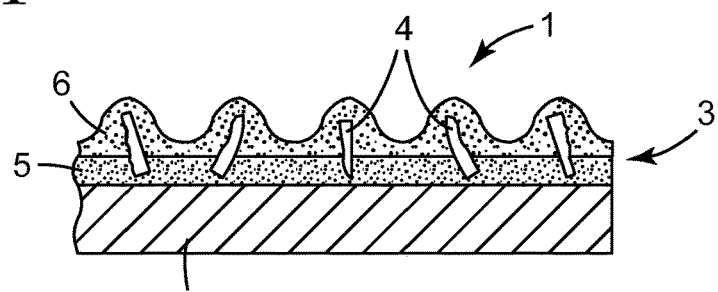
FIG. 2 is a fragmentary cross-sectional schematic view of a coated abrasive article including abrasive particles according to the present disclosure.

An example of a coated abrasive article is depicted in FIG. 2. Referring to FIG. 2, coated abrasive article 1 has a backing (substrate) 2 and abrasive layer 3. Abrasive layer 3 includes fused, polycrystalline ceramic abrasive particles made according to the present disclosure 4 secured to a major surface of backing 2 by make coat 5 and size coat 6. In some instances, a supersize coat (not shown) is used.

Bonded abrasive articles typically include a shaped mass of abrasive particles held together by an organic, metallic, or vitrified binder. Such shaped mass can be, for example, in the form of a wheel, such as a grinding wheel or cutoff wheel. The diameter of grinding wheels typically is about 1 cm to over 1 meter; the diameter of cut off wheels about 1 cm to over 80 cm (more typically 3 cm to about 50 cm). The cut off wheel thickness is typically about 0.5 mm to about 5 cm, more typically about 0.5 mm to about 2 cm. The shaped mass can also be in the form, for example, of a honing stone, segment, mounted point, disc (e.g., double disc grinder) or other conventional bonded abrasive shape. Bonded abrasive articles typically comprise about 3-50 percent by volume bond material, about 30-90 percent by volume abrasive particles (or abrasive particle blends), up to 50 percent by volume additives (including grinding aids), and up-to 70 percent by volume pores, based on the total volume of the bonded abrasive article.

Figure 3:
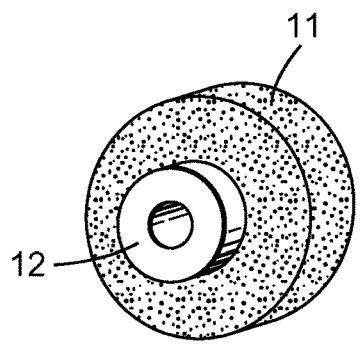
FIG. 3 is a perspective view of a bonded abrasive article including abrasive particles according to the present disclosure.

An exemplary grinding wheel is shown in FIG. 3. Referring now to FIG. 3, grinding wheel 10 is depicted, which includes fused, polycrystalline ceramic abrasive particles made according to the present disclosure 11, molded in a wheel and mounted on hub 12.

Figure 4:
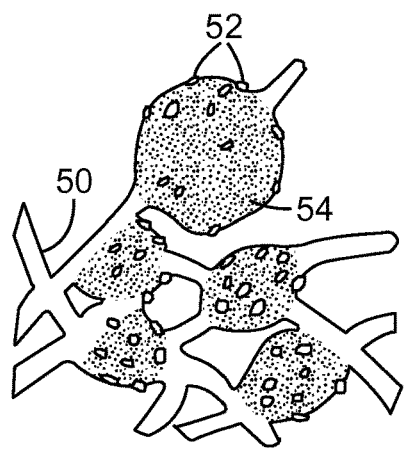
FIG. 4 is an enlarged schematic view of a nonwoven abrasive article including abrasive particles according to the present disclosure.
Figure 5:
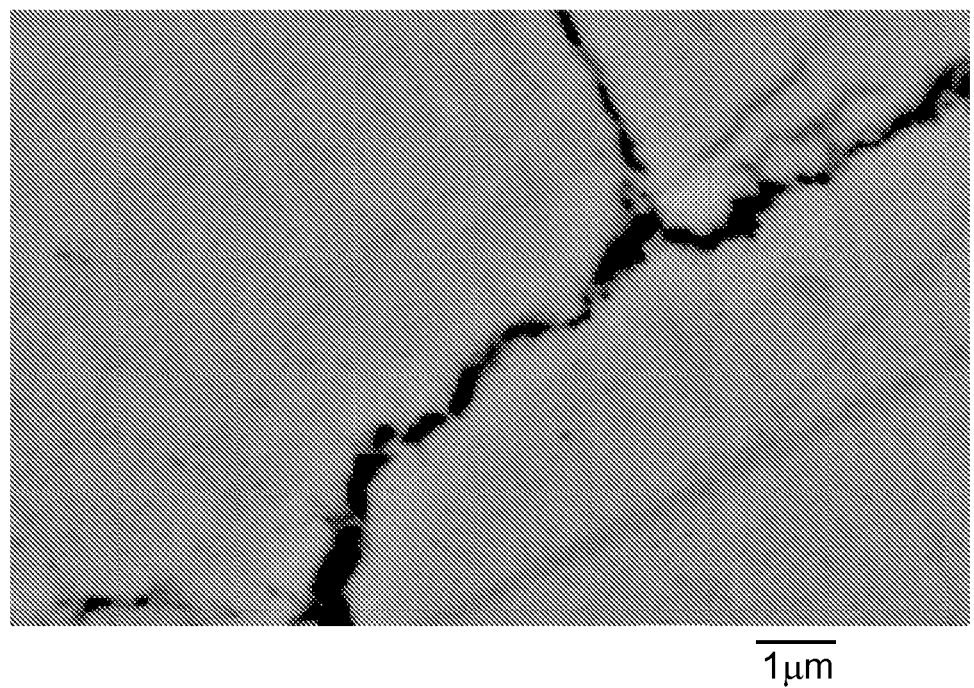
FIG. 5 is scanning electron micrograph of sintered abrasive particles produced in Example 1.

Nonwoven abrasive articles typically include an open porous lofty polymer filament structure having fused, polycrystalline ceramic abrasive particles made according to the present disclosure distributed throughout the structure and adherently bonded therein by an organic binder. Examples of filaments include polyester fibers, polyamide fibers, and polyaramid fibers. An exemplary nonwoven abrasive article is shown in FIG. 4. Referring to FIG. 4, a schematic depiction, enlarged about 100 times, of a typical nonwoven abrasive article is shown, comprises fibrous mat 150 as a substrate, onto which fused, polycrystalline ceramic abrasive particles made according to the present disclosure 152 are adhered by binder 154.

Useful abrasive brushes include those having a plurality of bristles unitary with a backing (see, e.g., U.S. Pat. No. 5,427,595 (Pihl et al.); U.S. Pat. No. 5,443,906 (Pihl et al.); U.S. Pat. No. 5,679,067 (Johnson et al.), and U.S. Pat. No. 5,903,951 (Ionta et al.)). Desirably, such brushes are made by injection molding a mixture of polymer and abrasive particles.

Suitable organic binders for making abrasive articles include thermosetting organic polymers. Examples of suitable thermosetting organic polymers include phenolic resins, urea-formaldehyde resins, melamine-formaldehyde resins, urethane resins, acrylate resins, polyester resins, aminoplast resins having pendant α,β-unsaturated carbonyl groups, epoxy resins, acrylated urethane, acrylated epoxies, and combinations thereof. The binder and/or abrasive article may also include additives such as fibers, lubricants, wetting agents, thixotropic materials, surfactants, pigments, dyes, antistatic agents (e.g., carbon black, vanadium oxide, and/or graphite), coupling agents (e.g., silanes, titanates, and/or zircoaluminates), plasticizers, suspending agents, and the like. The amounts of these optional additives are selected to provide the desired properties. The coupling agents can improve adhesion to the sintered abrasive particles and/or filler. The binder chemistry may be thermally cured, radiation cured or combinations thereof. Additional details on binder chemistry may be found in U.S. Pat. No. 4,588,419 (Caul et al.); U.S. Pat. No. 4,751,138 (Tumey et al.), and U.S. Pat. No. 5,436,063 (Follett et al.).

More specifically with regard to vitrified bonded abrasives, vitreous bonding materials, which exhibit an amorphous structure and are typically hard, are well known in the art. In some cases, the vitreous bonding material includes crystalline phases. Bonded, vitrified abrasive articles made according to the present disclosure may be in the shape of a wheel (including cut off wheels), honing stone, mounted pointed or other conventional bonded abrasive shape. In some embodiments, a vitrified bonded abrasive article made according to the present disclosure is in the form of a grinding wheel.

Examples of metal oxides that are used to form vitreous bonding materials include: silica, silicates, alumina, soda, calcia, potassia, titania, iron oxide, zinc oxide, lithium oxide, magnesia, boria, aluminum silicate, borosilicate glass, lithium aluminum silicate, combinations thereof, and the like. Typically, vitreous bonding materials can be formed from composition comprising from 10 to 100 percent of glass frit, although more typically the composition comprises 20 to 80 percent of glass frit, or 30 to 70 percent of glass frit. The remaining portion of the vitreous bonding material can be a non-frit material. Alternatively, the vitreous bond may be derived from a non-frit containing composition. Vitreous bonding materials are typically matured at a temperature(s) in a range of about 700 to about 1500° C., usually in a range of about 800 to about 1300° C., sometimes in a range of about 900 to about 1200° C., or even in a range of about 950 to about 1100° C. The actual temperature at which the bond is matured depends, for example, on the particular bond chemistry.

In some embodiments, vitrified bonding materials include those comprising silica, alumina (desirably, at least 10 percent by weight alumina), and boria (desirably, at least 10 percent by weight boria). In most cases, the vitrified bonding material further comprises alkali metal oxide(s) (e.g., $Na_2O$ and $K_2O$) (in some cases at least 10 percent by weight alkali metal oxide(s)).

Binder materials may also contain filler materials or grinding aids, typically in the form of a particulate material.

Typically, the particulate materials are inorganic materials. Examples of useful fillers for the present disclosure include: metal carbonates (e.g., calcium carbonate (e.g., chalk, calcite, marl, travertine, marble and limestone), calcium magnesium carbonate, sodium carbonate, magnesium carbonate), silica (e.g., quartz, glass beads, glass bubbles and glass fibers) silicates (e.g.; talc, clays, (montmorillonite) feldspar, mica, calcium silicate, calcium metasilicate, sodium aluminosilicate, sodium silicate) metal sulfates (e.g., calcium sulfate, barium sulfate, sodium sulfate, aluminum sodium sulfate, aluminum sulfate), gypsum, vermiculite, wood flour, aluminum trihydrate, carbon black, metal oxides (e.g., calcium oxide (lime), aluminum oxide, titanium dioxide), and metal sulfites (e.g., calcium sulfite).

In general, the addition of a grinding aid increases the useful life of the abrasive article. A grinding aid is a material that has a significant effect on the chemical and physical processes of abrading, which results in improved performance. Although not wanting to be bound by theory, it is believed that a grinding aid(s) will (a) decrease the friction between the sintered abrasive particles and the workpiece being abraded, (b) prevent the sintered abrasive particles from "capping" (i.e., prevent metal particles from becoming welded to the tops of the sintered abrasive particles), or at least reduce the tendency of abrasive particles to cap, (c) decrease the interface temperature between the sintered abrasive particles and the workpiece, or (d) decreases the grinding forces.

Grinding aids encompass a wide variety of different materials and can be inorganic or organic based. Examples of chemical groups of grinding aids include waxes, organic halide compounds, halide salts and metals and their alloys. The organic halide compounds will typically break down during abrading and release a halogen acid or a gaseous halide compound. Examples of such materials include chlorinated waxes like tetrachloronaphthalene, pentachloronaphthalene, and polyvinyl chloride. Examples of halide salts include sodium chloride, potassium cryolite, sodium cryolite, ammonium cryolite, potassium tetrafluoroborate, sodium tetrafluoroborate, silicon fluorides, potassium chloride, and magnesium chloride. Examples of metals include, tin, lead, bismuth, cobalt, antimony, cadmium, and iron titanium. Other miscellaneous grinding aids include sulfur, organic sulfur compounds, graphite, and metallic sulfides. It is also within the scope of the present disclosure to use a combination of different grinding aids, and in some instances this may produce a synergistic effect.

Grinding aids can be particularly useful in coated abrasive and bonded abrasive articles. In coated abrasive articles, grinding aid is typically used in the supersize coat, which is applied over the surface of the sintered abrasive particles. Sometimes, however, the grinding aid is added to the size coat. Typically, the amount of grinding aid incorporated into coated abrasive articles are about 50-300 g/m$^2$ (desirably, about 80 to 160 g/m$^2$). In vitrified bonded abrasive articles grinding aid is typically impregnated into the pores of the article.

The abrasive articles can contain 100 percent fused, polycrystalline ceramic abrasive particles made according to the present disclosure, or blends of such abrasive particles with other abrasive particles and/or diluent particles. However, at least about 2 percent by weight, desirably at least about 5 percent by weight, and more desirably about 30 to 100 percent by weight, of the sintered abrasive particles in the abrasive articles should be fused, polycrystalline ceramic abrasive particles made according to the present disclosure. In some instances, the sintered abrasive particles made according to the present disclosure may be blended with another abrasive particles and/or diluent particles at a ratio between 5 to 75 percent by weight, about 25 to 75 percent by weight, about 40 to 60 percent by weight, or about 50 to 50 percent by weight (i.e., in equal amounts by weight). Examples of suitable conventional abrasive particles include fused aluminum oxide (including white fused alumina, heat-treated aluminum oxide and brown aluminum oxide), silicon carbide, boron carbide, titanium carbide, diamond, cubic boron nitride, garnet, fused alumina-zirconia, and sol-gel-derived abrasive particles, and combinations thereof. The sol-gel-derived abrasive particles may be seeded or non-seeded. Likewise, the sol-gel-derived abrasive particles may be randomly shaped or have a shape associated with them, such as a rod or a triangle. Examples of sol gel abrasive particles include those described in U.S. Pat. No. 4,314,827 (Leitheiser et al.); U.S. Pat. No. 4,518,397 (Leitheiser et al.); U.S. Pat. No. 4,623,364 (Cottringer et al.); U.S. Pat. No. 4,744,802 (Schwabel); U.S. Pat. No. 4,770,671 (Monroe et al.); U.S. Pat. No. 4,881,951 (Wood et al.); U.S. Pat. No. 5,011,508 (Wald et al.); U.S. Pat. No. 5,090,968 (Pellow); U.S. Pat. No. 5,139,978 (Wood); U.S. Pat. No. 5,201,916 (Berg et al.); U.S. Pat. No. 5,227,104 (Bauer); U.S. Pat. No. 5,366,523 (Rowenhorst et al.); U.S. Pat. No. 5,429,647 (Larmie); U.S. Pat. No. 5,498,269 (Larmie); and U.S. Pat. No. 5,551,963 (Larmie). Additional details concerning sintered alumina abrasive particles made by using alumina powders as a raw material source can also be found, for example, in U.S. Pat. No. 5,259,147 (Falz); U.S. Pat. No. 5,593,467 (Monroe); and U.S. Pat. No. 5,665,127 (Moltgen). Additional details concerning fused abrasive particles, can be found, for example, in U.S. Pat. No. 1,161,620 (Coulter); U.S. Pat. No. 1,192,709 (Tone); U.S. Pat. No. 1,247,337 (Saunders et al.); U.S. Pat. No. 1,268,533 (Allen); U.S. Pat. No. 2,424,645 (Baumann et al.); U.S. Pat. No. 3,891,408 (Rowse et al.); U.S. Pat. No. 3,781,172 (Pett et al.); U.S. Pat. No. 3,893,826 (Quinan et al.); U.S. Pat. No. 4,126,429 (Watson); U.S. Pat. No. 4,457,767 (Poon et al.); U.S. Pat. No. 5,023,212 (Dubots et al.); U.S. Pat. No. 5,143,522 (Gibson et al.); and U.S. Pat. No. 5,336,280 (Dubots et al.). In some instances, blends of abrasive particles may result in an abrasive article that exhibits improved grinding performance in comparison with abrasive articles comprising 100 percent of either type of abrasive particle. If there is a blend of abrasive particles, the abrasive particle types forming the blend may be of the same size. Alternatively, the abrasive particle types may be of different particle sizes. For example, the larger sized abrasive particles may be fused, polycrystalline ceramic abrasive particles made according to the present disclosure, with the smaller sized particles being another abrasive particle type. Conversely, for example, the smaller sized abrasive particles may be fused, polycrystalline ceramic abrasive particles made according to the present disclosure, with the larger sized particles being another abrasive particle type.

Examples of suitable diluent particles include marble, gypsum, flint, silica, iron oxide, aluminum silicate, glass (including glass bubbles and glass beads), alumina bubbles, alumina beads and diluent agglomerates.

Fused, polycrystalline ceramic abrasive particles according to the present disclosure can also be combined in or with abrasive agglomerates. Abrasive agglomerate particles typically comprise a plurality of abrasive particles, a binder, and optional additives. The binder may be organic and/or inorganic. Abrasive agglomerates may be randomly shape or have a predetermined shape associated with them. The shape may be a block, cylinder, pyramid, coin, square, or the like.

Abrasive agglomerate particles typically have particle sizes ranging from about 100 to about 5000 microns, typically about 250 to about 2500 microns. Additional details regarding abrasive agglomerate particles may be found, for example, in U.S. Pat. No. 4,311,489 (Kressner); U.S. Pat. No. 4,652,275 (Bloecher et al.); U.S. Pat. No. 4,799,939 (Bloecher et al.); U.S. Pat. No. 5,549,962 (Holmes et al.), and U.S. Pat. No. 5,975,988 (Christianson).

The sintered abrasive particles may be uniformly distributed in the abrasive article or concentrated in selected areas or portions of the abrasive article. For example, in a coated abrasive, there may be two layers of abrasive particles. The first layer comprises abrasive particles other than fused, polycrystalline ceramic abrasive particles made according to the present disclosure, and the second (outermost) layer comprises fused, polycrystalline ceramic abrasive particles made according to the present disclosure. Likewise in a bonded abrasive, there may be two distinct sections of the grinding wheel. The outermost section may comprise abrasive particles made according to the present disclosure, whereas the innermost section does not. Alternatively, fused, polycrystalline ceramic abrasive particles made according to the present disclosure may be uniformly distributed throughout the bonded abrasive article. Further details regarding coated abrasive articles can be found, for example, in U.S. Pat. No. 4,734,104 (Broberg); U.S. Pat. No. 4,737,163 (Larkey); U.S. Pat. No. 5,203,884 (Buchanan et al.); U.S. Pat. No. 5,152,917 (Pieper et al.); U.S. Pat. No. 5,378,251 (Culler et al.); U.S. Pat. No. 5,417,726 (Stout et al.); U.S. Pat. No. 5,436,063 (Follett et al.); U.S. Pat. No. 5,496,386 (Broberg et al.); U.S. Pat. No. 5,609,706 (Benedict et al.); U.S. Pat. No. 5,520,711 (Helmin); U.S. Pat. No. 5,954,844 (Law et al.); U.S. Pat. No. 5,961,674 (Gagliardi et al.); and U.S. Pat. No. 5,975,988 (Christianson). Further details regarding bonded abrasive articles can be found, for example, in U.S. Pat. No. 4,543,107 (Rue); U.S. Pat. No. 4,741,743 (Narayanan et al.); U.S. Pat. No. 4,800,685 (Haynes et al.); U.S. Pat. No. 4,898,597 (Hay et al.); U.S. Pat. No. 4,997,461 (Markhoff-Matheny et al.); U.S. Pat. No. 5,037,453 (Narayanan et al.); U.S. Pat. No. 5,110,332 (Narayanan et al.); and U.S. Pat. No. 5,863,308 (Qi et al.). Further details regarding vitreous bonded abrasives can be found, for example, in U.S. Pat. No. 4,543,107 (Rue); U.S. Pat. No. 4,898,597 (Hay et al.); U.S. Pat. No. 4,997,461 (Markhoff-Matheny et al.); U.S. Pat. No. 5,094,672 (Giles Jr. et al.); U.S. Pat. No. 5,118,326 (Sheldon et al.); U.S. Pat. No. 5,131,926 (Sheldon et al.); U.S. Pat. No. 5,203,886 (Sheldon et al.); U.S. Pat. No. 5,282,875 (Wood et al.); U.S. Pat. No. 5,738,696 (Wu et al.), and U.S. Pat. No. 5,863,308 (Qi). Further details regarding nonwoven abrasive articles can be found, for example, in U.S. Pat. No. 2,958,593 (Hoover et al.).

The present disclosure further provides a method of abrading a surface. The method comprises contacting at least one abrasive particle, according to the present disclosure, with a surface of a workpiece; and moving at least one of the sintered abrasive particles or the contacted surface to abrade at least a portion of the surface with the abrasive particle. Methods for abrading with abrasive particles made according to the present disclosure range from snagging (i.e., high pressure high stock removal) to polishing (e.g., polishing medical implants with coated abrasive belts), wherein the latter is typically done with finer grades of abrasive particles. The sintered abrasive particles may also be used in precision abrading applications, such as grinding cam shafts with vitrified bonded wheels. The size of the sintered abrasive particles used for a particular abrading application will be apparent to those skilled in the art.

Abrading with abrasive particles according to the present disclosure may be done dry or wet. For wet abrading, the liquid may be introduced in the form of a light mist to complete flood. Examples of commonly used liquids include: water, water-soluble oil, organic lubricant, and emulsions. The liquid may serve to reduce the heat associated with abrading and/or act as a lubricant. The liquid may contain minor amounts of additives such as bactericide, antifoaming agents, and the like.

Abrasive particles made according to the present disclosure may be useful, for example, to abrade workpieces such as aluminum metal, carbon steels, mild steels, tool steels, stainless steel, hardened steel, titanium, glass, ceramics, wood, wood-like materials (e.g., plywood and particle board), paint, painted surfaces, organic coated surfaces and the like. The applied force during abrading typically ranges from about 1 to about 100 kilograms.

SELECT EMBODIMENTS OF THE PRESENT DISCLOSURE

In a first embodiment, the present disclosure provides a method of making sintered abrasive particles, the method comprising:

passing precursor particles through a flame under conditions such that they are converted into the sintered abrasive particles, wherein the precursor particles comprise a precursor of alpha alumina and wherein the precursor particles have an average particle size of less than or equal to 500 microns.

In a second embodiment, the present disclosure provides a method according to the first embodiment, wherein the sintered abrasive particles comprise alpha alumina having a cellular microstructure, and the alpha alumina has an areal porosity of less than or equal to 5 percent, as measured using image analysis by cross-section at 10,000 times magnification.

In a third embodiment, the present disclosure provides a method according to the first or second embodiment, wherein the precursor particles are essentially free of seed particles.

In a fourth embodiment, the present disclosure provides a method according to any one of the first to third embodiments, wherein the precursor particles are essentially free of alpha alumina grain size modifiers.

In a fifth embodiment, the present disclosure provides a method according to any one of the first to fourth embodiments, wherein the precursor particles are accelerated through the flame by gravity substantially along a longitudinal axis of the flame.

In a sixth embodiment, the present disclosure provides a method according to any one of the first to fifth embodiments, wherein the sintered abrasive particles comprise shaped abrasive particles.

In a seventh embodiment, the present disclosure provides a method according to any one of the first to sixth embodiments, wherein the precursor particles have a shape corresponding to a mold cavity used to shape it.

In an eighth embodiment, the present disclosure provides a method according to any one of the second to seventh embodiments, wherein the cellular microstructure comprises alpha alumina crystal grains, and wherein the alpha alumina crystal grains have a maximum dimension of less than about 3 microns.

In a ninth embodiment, the present disclosure provides a method according to any one of the first to eighth embodiments, wherein the sintered abrasive particles consist essentially of alpha alumina.

In a tenth embodiment, the present disclosure provides sintered abrasive particles having a cellular microstructure comprising alpha alumina crystal grains of alpha alumina having a maximum dimension of less than about 3 microns, wherein the sintered abrasive particles have an average particle size of less than or equal to 500 microns, and wherein the sintered abrasive particles are essentially free of seed particles and alpha alumina grain size modifiers.

In an eleventh embodiment, the present disclosure provides sintered abrasive particles according to the tenth embodiment, wherein the alpha alumina has an areal porosity of less than or equal to 5 percent, as measured using image analysis by cross-section at 10,000 times magnification.

In a twelfth embodiment, the present disclosure provides sintered abrasive particles according to the tenth or eleventh embodiment, wherein the sintered abrasive particles comprise shaped abrasive particles.

In a thirteenth embodiment, the present disclosure provides sintered abrasive particles according to any one of the tenth to twelfth embodiments, wherein at least a portion of the sintered abrasive particles comprises truncated pyramids.

In a fourteenth embodiment, the present disclosure provides an abrasive article comprising a binder and a plurality of abrasive particles, wherein at least a portion of the sintered abrasive particles are sintered abrasive particles according to any one of the tenth to thirteenth embodiments.

In a fifteenth embodiment, the present disclosure provides an abrasive article according to the fourteenth embodiment, wherein the abrasive article is a bonded abrasive article, a non-woven abrasive article, or a coated abrasive article.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight.

In the Examples section below, X-Ray diffraction analysis was used to determine the presence of alpha-alumina where indicated.

Preparation of Shaped Calcined Boehmite Particles

A sample of boehmite sol-gel was made using the following recipe: aluminum oxide monohydrate powder (1600 parts) available as DISPERAL from Sasol North America, Inc., Houston, Tex. was dispersed by high shear mixing a solution containing water (2400 parts) and 70 weight percent aqueous nitric acid (72 parts) for 11 minutes. The resulting sol-gel was aged for at least 1 hour before coating. The sol-gel was forced into production polypropylene tooling having equilateral triangular shaped mold cavities with a dimension of 100 microns on a side and a depth of 25 microns. The sol-gel was forced into the cavities with a putty knife so that the openings of the production tooling were completely filled. Prior to filling the cavities, a mold release agent, 1 percent by weight peanut oil in methanol, was used to coat the production tooling with about 0.5 mg/in² (0.08 mg/cm²) of peanut oil. Excess methanol was removed by placing sheets of the production tooling in an air convection oven for 5 minutes at 45° C. The sol-gel coated production tooling was placed in an air convection oven at 45° C. for at least 45 minutes to dry. Dried shaped sol-gel particles were removed from the production tooling by passing it over an ultrasonic horn, and then calcined at approximately 650° C. resulting shaped calcined boehmite particles.

Example 1

Shaped calcined boehmite particles prepared according to the Preparation of Shaped Calcined Boehmite Particles (above) were graded using test sieves to retain the −140+200 mesh (i.e., the fraction collected between 106-micron opening size and 75-micron opening size test sieves). The resulting screened particles were fed slowly (about 0.5 gram/minute) using a vibratory feeder into a funnel which fed a hydrogen/oxygen/argon (in a respective ratio of 18/15/0) torch flame which heated the calcined particles and carried them directly into a 19-liter (5-gallon) rectangular metal container (41 centimeters (cm) by 53 cm by 18 cm height) that effectively quenched the resultant sintered abrasive particles. The torch was a Bethlehem bench burner PM2D Model B obtained from Bethlehem Apparatus Co., Hellertown, Pa. The torch had a central feed port (3/16 inch (0.475 cm) inner diameter) through which the feed particles were introduced vertically downward into the flame as a mixture with argon gas along its longitudinal axis. The angle at which the flame hit the metal container was approximately 90°, and the flame length, from burner to container surface, was approximately 38 centimeters (cm). The resulting shaped sintered abrasive particles were collected for analysis.

The resulting sintered particles were collected and a sample was mounted and polished. Surprisingly, the resulting observed microstructure, shown in FIG. 5, was densified and had non-vermicular cells approximately ten microns in size. The boundaries between cells were cracked.

Comparative Example A

Figure 6:
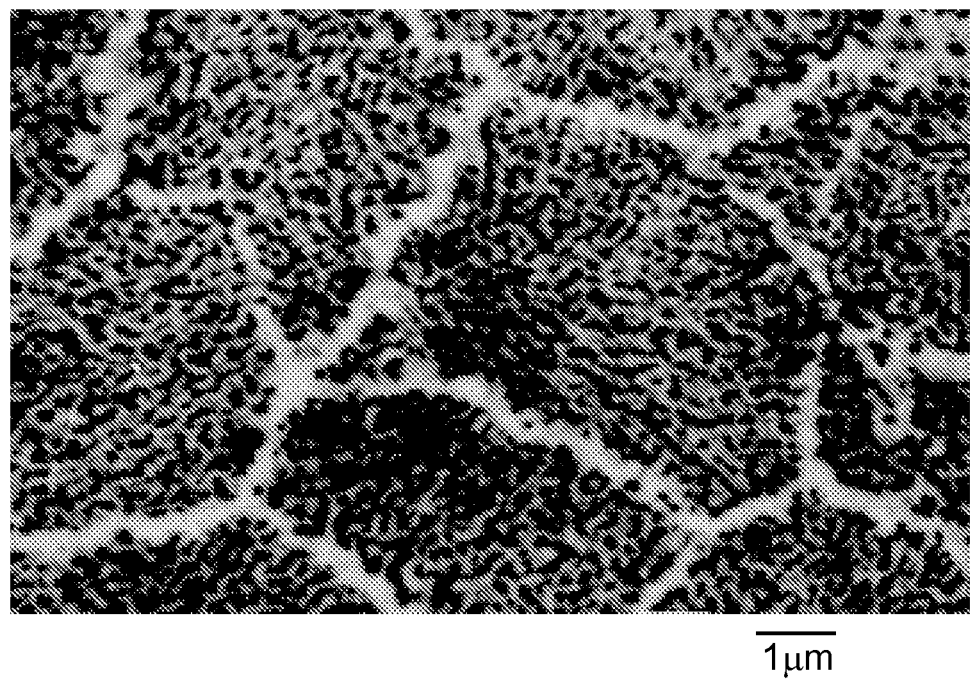
FIG. 6 is a scanning electron micrograph of sintered abrasive particles produced in Comparative Example A.
Figure 7:
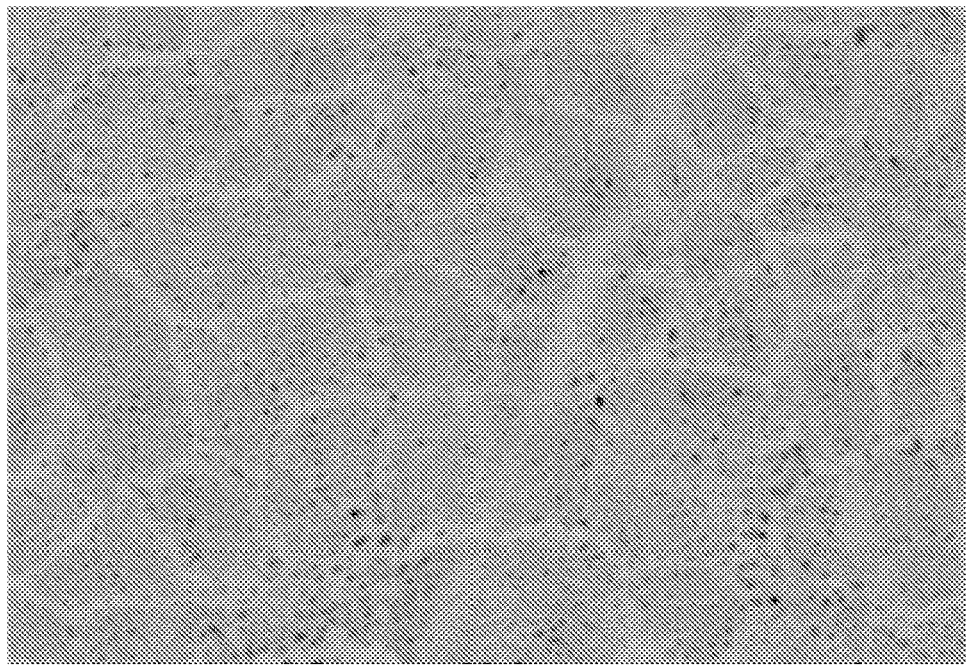
FIGS. 7-12 are scanning electron micrographs of sintered abrasive particles produced in Examples 2-7, respectively.
Figure 8:
Figure 9:
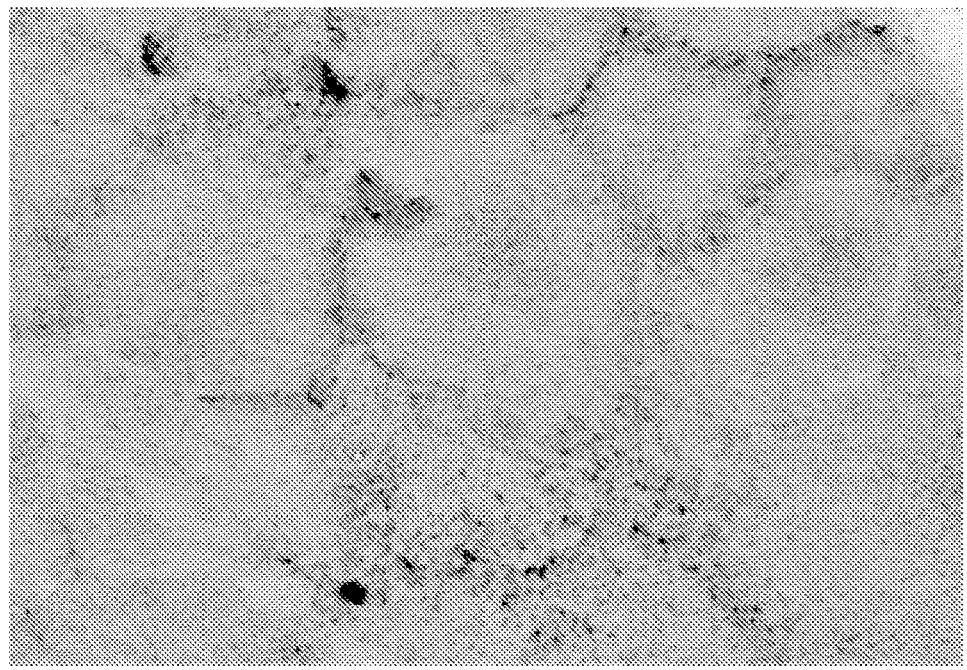
Figure 10:
Figure 11:
Figure 12:
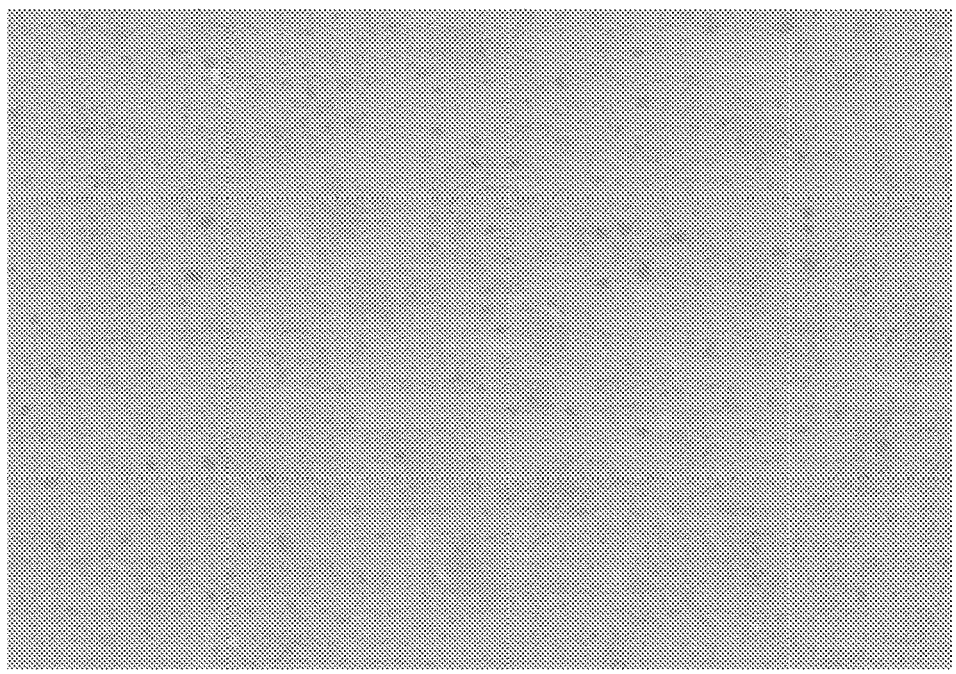

Example 1 was repeated, except that the shaped calcined boehmite particles were heated in a box kiln at 1200° C. for one hour prior to being introduced to the torch flame. Using this firing condition, the shaped calcined boehmite particles were completely converted to alpha alumina with minimal densification. This material was subsequently fired using the flame firing procedure. The resulting fired particles were collected and a sample was mounted and polished. The microstructure of the resulting materials was totally vermicular in character as shown in FIG. 6. The cells of the particles were porous in character, yet there was no cracking along the cell boundary, totally opposite to that observed in Example 1.

Examples 2-7

Example 1 was repeated, except that the mixture of gases was adjusted as reported in Table 1. The angle at which the flame hit the metal container was approximately 90°, and the flame length (including the post-combusting hot gas tail), from burner to container surface, was approximately 70 centimeters (cm). The resulting shaped sintered abrasive particles were collected for analysis. An optical pyrometer to measure the temperature of the particles exiting the flame. Representative microstructures for Examples 2-7 are shown in FIGS. 7-12, respectively.

Comparative Example B

Figure 13:
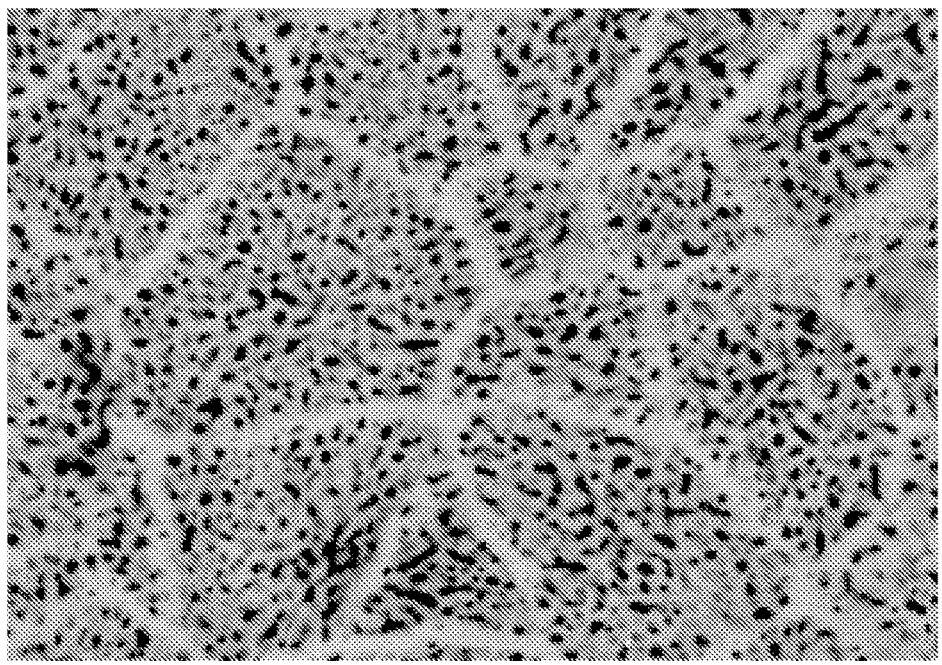
FIG. 13 is a scanning electron micrograph of sintered abrasive particles produced in Comparative Example B.

Comparative Example B was prepared identically to Example 2, except that the shaped calcined boehmite particles were fired in a box kiln at 1400° C. for 20 minutes, whereby they were converted to alpha alumina Representative microstructure of Comparative Example B is shown in FIG. 13.

Example 8

Example 1 was repeated, except that the torch used a gas mixture composed of 16 parts hydrogen, 16 parts oxygen and 2 parts argon. This is the gas flow mixture that produced the lowest temperature flame that successfully produced alpha alumina grain as determined by x-ray diffraction analysis. A sample of the shaped alpha alumina abrasive grain was mixed with a mounting resin (Transparent Thermoplastic Powder 165-10005 available from Allied High Tech Products, Rancho Dominguez, Calif.) and polished using diamond slurries to an optically smooth surface in order to evaluate cross-sections of the fired grain by backscattered electron imaging using scanning electron microscopy (SEM) at 10,000 times magnification.

Example 9

Example 8 was repeated, with the exception that the torch conditions used fired through the torch using a gas mixture composed of 16 parts hydrogen, 16 parts oxygen and 3 parts argon. The porosity of Example 8 was compared against Example 9 that was fired at a lower flame temperature and was significantly more porous than Example 8. Photographs of the two examples are shown in FIGS. 14 and 15, respectively.

Figure 14:
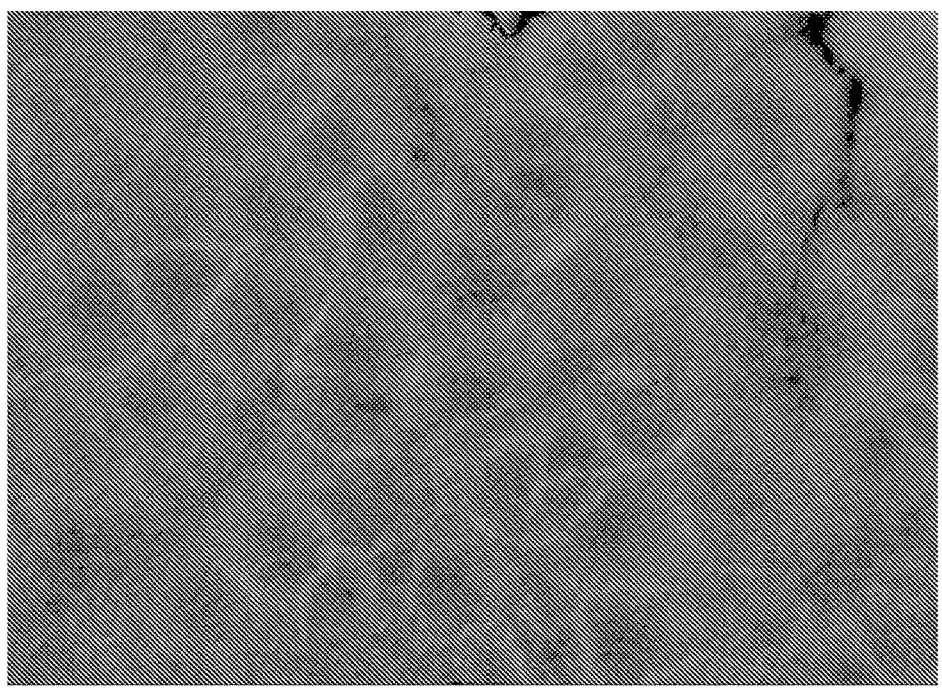
FIGS. 14 and 15 are scanning electron micrographs of specimens used for image analysis of Examples 8 and 9, respectively.
Figure 15:
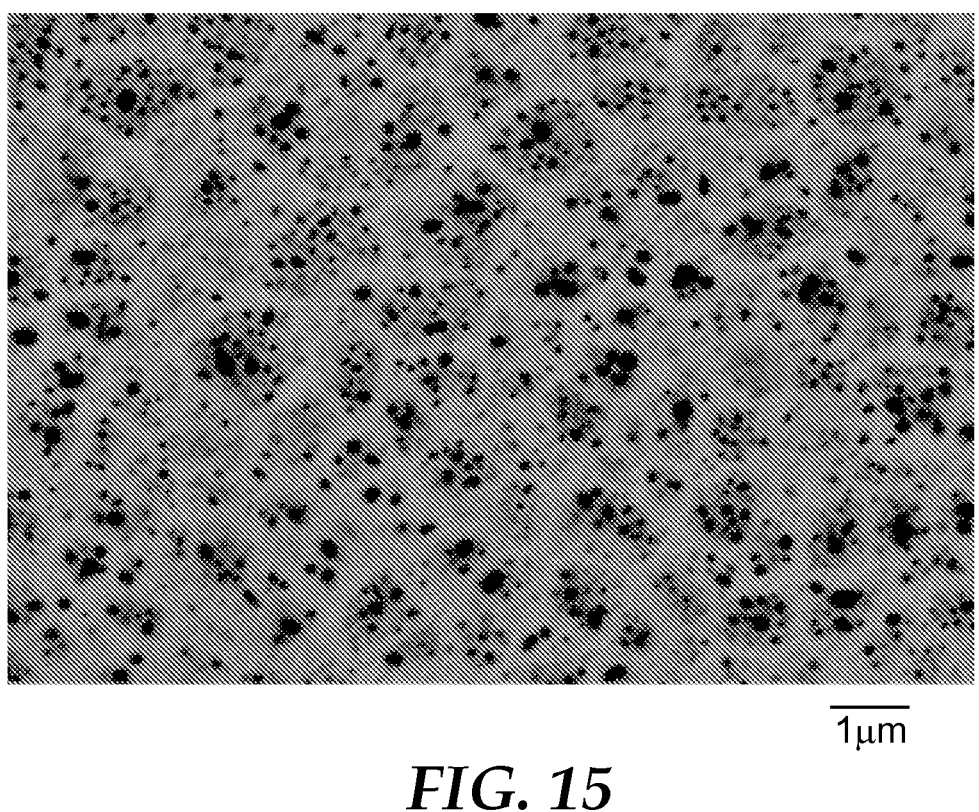

In FIGS. 14 and 15, dark spots indicate pores and dark fissures indicate cracks. The amount of porosity in the samples was measured using ImageJ software available as free software from the U.S. National Institute of Health, Bethesda, Md. The porosity of each sample was evaluated using the software and was measured to be 2.8 percent of the area in the photomicrographs of the fired abrasive particles and 12.0 percent of the area in the photomicrographs of the incomplete fired grain. This demonstrates that densification of alpha alumina derived from boehmite can be achieved without the use of modifiers or seed.

TABLE 1

| EXAMPLE | PARTS HYDROGEN | PARTS OXYGEN | PARTS ARGON | TEMPERATURE OF PARTICLES EXITING FLAME BY OPTICAL PYROMETER, ° C. | FIG. NO. SHOWING MICRO-STRUCTURE |
|---|---|---|---|---|---|
| 2 | 18 | 15 | 1 | 960 | 7 |
| 3 | 18 | 15 | 2 | 940 | 8 |
| 4 | 18 | 15 | 3 | 900 | 9 |
| 5 | 18 | 15 | 4 | 880 | 10 |
| 6 | 18 | 15 | 5 | 850 | 11 |
| 7 | 18 | 14 | 5 | unable to be measured* | 12 |
| Comparative Example B | na** | na | na | [box kiln at 1400° C.] | 13 |
| 8 | 16 | 16 | 2 | unable to be measured* | 14 |
| 9 | 16 | 16 | 3 | unable to be measured* | 15*** |

*insufficient optical emission from the particles exiting the flame
**"na" means not applicable
***optical examination of the particles indicated that very few of the particles had been converted to alpha-alumina.

Because of the inherent nature of how the particles fall through the flame, there was significant variability in the microstructure observed in the Examples. Again, each Example contained numerous spherical particles indicating that the particles see a much higher temperature than measured. However the fraction of spherical particles obtained on firing observed became smaller as the measured temperature became cooler.

Other modifications and variations to the present disclosure may be practiced by those of ordinary skill in the art, without departing from the spirit and scope of the present disclosure, which is more particularly set forth in the appended claims. It is understood that aspects of the various embodiments may be interchanged in whole or part or combined with other aspects of the various embodiments. All cited references, patents, or patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A method of making sintered abrasive particles, the method comprising:
    passing precursor particles vertically downward through a flame along its longitudinal axis under conditions such that they are converted into the sintered abrasive particles, wherein the precursor particles comprise a calcined precursor of alpha alumina, and wherein the precursor particles have an average particle size of less than or equal to 500 microns.

2. The method of claim 1, wherein the sintered abrasive particles comprise alpha alumina having a cellular microstructure, and the alpha alumina has an areal porosity of less than or equal to 5 percent, as measured using image analysis by cross-section at 10,000 times magnification.

3. The method of claim 1, wherein the precursor particles contain, on a weight basis, less than 0.1 percent by weight of seed particles.

4. The method of claim 1, wherein the precursor particles contain, on a weight basis, less than 0.1 percent by weight of alpha alumina grain size modifiers.

5. The method of claim 1, wherein the sintered abrasive particles comprise shaped abrasive particles.

6. The method of claim 1, wherein the precursor particles have a shape corresponding to a mold cavity used to shape it.

7. The method of claim 1, wherein the sintered abrasive particles have a cellular microstructure comprising alpha alumina crystal grains, and wherein the alpha alumina crystal grains have a maximum dimension of less than about 3 microns.

8. The method of claim 1, wherein the sintered abrasive particles consist essentially of alpha alumina.

* * * * *

UNITED STATES PATENT AND TRADEMARK OFFICE
CERTIFICATE OF CORRECTION

PATENT NO. : 10,400,146 B2  
APPLICATION NO. : 14/782475  
DATED : September 3, 2019  
INVENTOR(S) : Dwight Erickson et al.

Page 1 of 1

It is certified that error appears in the above-identified patent and that said Letters Patent is hereby corrected as shown below:

In the Specification

Column 10  
Line 4, Delete "alumina" and insert -- alumina. --, therefor.

Column 10  
Line 51, Delete "JI580," and insert -- JIS80, --, therefor.

Column 10  
Line 52, Delete "JI5150, JI5180, JI5220, JI5240, JI5280, JI5320," and insert -- JIS150, JIS180, JIS220, JIS240, JIS280, JIS320, --, therefor.

Column 10  
Line 53, Delete "JI5360, JI5400, JI5600, JI5800," and insert -- JIS360, JIS400, JIS600, JIS800, --, therefor.

Column 10  
Lines 53-54, Delete "J151500, J152500, J154000, J156000, J158000," and insert -- JIS1500, JIS2500, JIS4000, JIS6000, JIS8000, --, therefor.

Column 19  
Line 30, Delete "alumina" and insert -- alumina. --, therefor.

Signed and Sealed this  
Nineteenth Day of May, 2020

Andrei Iancu  
*Director of the United States Patent and Trademark Office*